United States Patent
Murakami et al.

(10) Patent No.: US 11,955,283 B2
(45) Date of Patent: Apr. 9, 2024

(54) DIELECTRIC CERAMIC COMPOSITION AND ELECTRONIC DEVICE

(71) Applicant: TDK CORPORATION, Tokyo (JP)

(72) Inventors: Taku Murakami, Tokyo (JP); Nobuto Morigasaki, Tokyo (JP); Dan Sakurai, Tokyo (JP); Takuma Ariizumi, Tokyo (JP); Toshihiko Kaneko, Tokyo (JP)

(73) Assignee: TDK CORPORATION, Tokyo (JP)

( * ) Notice: Subject to any disclaimer, the term of this patent is extended or adjusted under 35 U.S.C. 154(b) by 426 days.

(21) Appl. No.: 17/195,366

(22) Filed: Mar. 8, 2021

(65) Prior Publication Data

US 2021/0304966 A1   Sep. 30, 2021

(30) Foreign Application Priority Data

Mar. 26, 2020 (JP) ................. 2020-056534

(51) Int. Cl.
*H01G 4/12* (2006.01)
*C04B 35/468* (2006.01)
*H01G 4/30* (2006.01)

(52) U.S. Cl.
CPC ....... *H01G 4/1227* (2013.01); *C04B 35/4682* (2013.01); *H01G 4/30* (2013.01); *C04B 2235/3206* (2013.01); *C04B 2235/3224* (2013.01); *C04B 2235/3236* (2013.01); *C04B 2235/3239* (2013.01); *C04B 2235/3262* (2013.01); *C04B 2235/3418* (2013.01); *C04B 2235/442* (2013.01)

(58) Field of Classification Search
CPC .... H01G 4/1227; H01G 4/30; C04B 35/4682; C04B 2235/3206; C04B 2235/3224; C04B 2235/3236; C04B 2235/3239; C04B 2235/3262; C04B 2235/3418
See application file for complete search history.

(56) References Cited

U.S. PATENT DOCUMENTS

| | | | |
|---|---|---|---|
| 6,331,932 B1 * | 12/2001 | Kobayashi | H01G 4/1227 361/321.1 |
| 2014/0240896 A1 * | 8/2014 | Morigasaki | H01G 4/30 501/138 |
| 2020/0039887 A1 | 2/2020 | Ariizumi et al. | |

FOREIGN PATENT DOCUMENTS

| | | |
|---|---|---|
| CN | 104003711 A | 8/2014 |
| JP | 2000-223351 A | 8/2000 |
| JP | 2012-166976 A | 9/2012 |

* cited by examiner

*Primary Examiner* — Bryan D. Ripa
*Assistant Examiner* — Cameron K Miller
(74) *Attorney, Agent, or Firm* — Oliff PLC

(57) ABSTRACT

A dielectric ceramic composition includes a barium titanate, an oxide of an R element, an oxide of an M element, and an oxide containing Si. The R element is one or more elements selected from Eu, Gd, Tb, Dy, Y, Ho, and Yb. The M element is one or more elements selected from Mg, Ca, Mn, V, and Cr. A ratio of an amount of the oxide of the R element in terms of $R_2O_3$ to an amount of the oxide containing Si in terms of $SiO_2$ is 0.8:1 to 2.2:1. A ratio of an amount of the oxide of the M element in terms of MO to the amount of the oxide containing Si in terms of $SiO_2$ is 0.2:1 to 1.8:1.50% or more of the number of dielectric particles constituting the dielectric ceramic composition is core-shell dielectric particles having a core-shell structure.

3 Claims, 4 Drawing Sheets

DIELECTRIC CERAMIC COMPOSITION AND ELECTRONIC DEVICE

BACKGROUND OF THE INVENTION

The present invention relates to a dielectric ceramic composition and an electronic device including dielectric layers made of the dielectric ceramic composition.

Ceramic capacitors are currently used in a wide range of applications, and there are various demanded characteristics for them. In products for automobiles that are expected to be used in high temperature environments, good capacity temperature characteristics are demanded. Meanwhile, as the electrification of automobiles progresses, the demand for reliability is increasing, and there is a demand for ceramic capacitors having high reliability in high temperature and high electric field.

In Patent Document 1, for example, a capacitance temperature change rate TCC and a high-temperature load test are carried out for evaluation of a multilayer ceramic capacitor. In the present situation, however, there is a demand for ceramic capacitors that can exhibit a good capacitance temperature characteristic and a high reliability even with more severe conditions.

Patent Document 1: JP2000223351 (A)

BRIEF SUMMARY OF INVENTION

The present invention has been achieved under such circumstances. It is an object of the invention to provide a dielectric ceramic composition having a good temperature characteristic and a high reliability in high temperature and high electric field and an electronic device made of the dielectric ceramic composition.

To achieve the above object, a dielectric ceramic composition according to the present invention comprises a barium titanate, an oxide of an R element, an oxide of an M element, and an oxide containing Si, wherein the R element is one or more elements selected from Eu, Gd, Tb, Dy, Y, Ho, and Yb, the M element is one or more elements selected from Mg, Ca, Mn, V, and Cr, a ratio of an amount of the oxide of the R element in terms of $R_2O_3$ to an amount of the oxide containing Si in terms of $SiO_2$ is 0.8:1 to 2.2:1, a ratio of an amount of the oxide of the M element in terms of MO to the amount of the oxide containing Si in terms of $SiO_2$ is 0.2:1 to 1.8:1, 50% or more of the number of dielectric particles constituting the dielectric ceramic composition is core-shell dielectric particles having a core-shell structure, at least one of the R element, the M element, and Si is solid-soluted into the barium titanate in shell portions of the core-shell dielectric particles, and core portions of the core-shell dielectric particles are substantially made of the barium titanate.

The present inventors have found that when the dielectric ceramic composition according to the present invention has the above-mentioned structure, an electronic device including the dielectric ceramic composition according to the present invention, such as multilayer ceramic capacitors, has a good temperature and a high reliability in high temperature and high electric field.

In the dielectric ceramic composition according to the present invention, preferably, the oxide of the R element is contained at 1.0 part by mol or more and 3.2 parts by mol or less in terms of $R_2O_3$, the oxide of the M element is contained at 0.2 parts by mol or more and 1.6 parts by mol or less in terms of MO, and the oxide containing Si is contained at 0.8 parts by mol or more and 3.2 parts by mol or less in terms of $SiO_2$, with respect to 100 parts by mol of the barium titanate.

When the dielectric ceramic composition according to the present invention has the above-mentioned structure, the dielectric ceramic composition according to the present invention has a good temperature and a high reliability in high temperature and high electric field, and the high-temperature insulation specific resistance value and the relative permittivity are improved.

An electronic device according to the present invention comprises a dielectric layer including the above-mentioned dielectric ceramic composition.

Preferably, the electronic device according to the present invention further comprises a pair of internal electrode layers sandwiching the dielectric layer, wherein at least a part of the dielectric particles are complete-solid-solution dielectric particles, and a ratio (LB/LA) of LB to LA is 0.2 or more and 0.9 or less, where LA is a length of a line segment perpendicular to the internal electrode layers and extending from a boundary between the dielectric layer and either one of the internal electrode layers and a boundary between the dielectric layer and the other one of the internal electrode layers, and LB is a total length of the shell portions and the complete-solid-solution dielectric particles on the line segment.

When the electronic device according to the present invention has the above-mentioned structure, the electronic device according to the present invention has a higher reliability in high temperature and high electric field.

In the electronic device according to the present invention, preferably, the dielectric particles have an average particle size of 0.15 μm or more and 0.30 μm or less.

When the electronic device according to the present invention has the above-mentioned structure, the electronic device according to the present invention has a better temperature characteristic and a higher reliability.

DETAILED DESCRIPTION OF INVENTION

Figure 1:
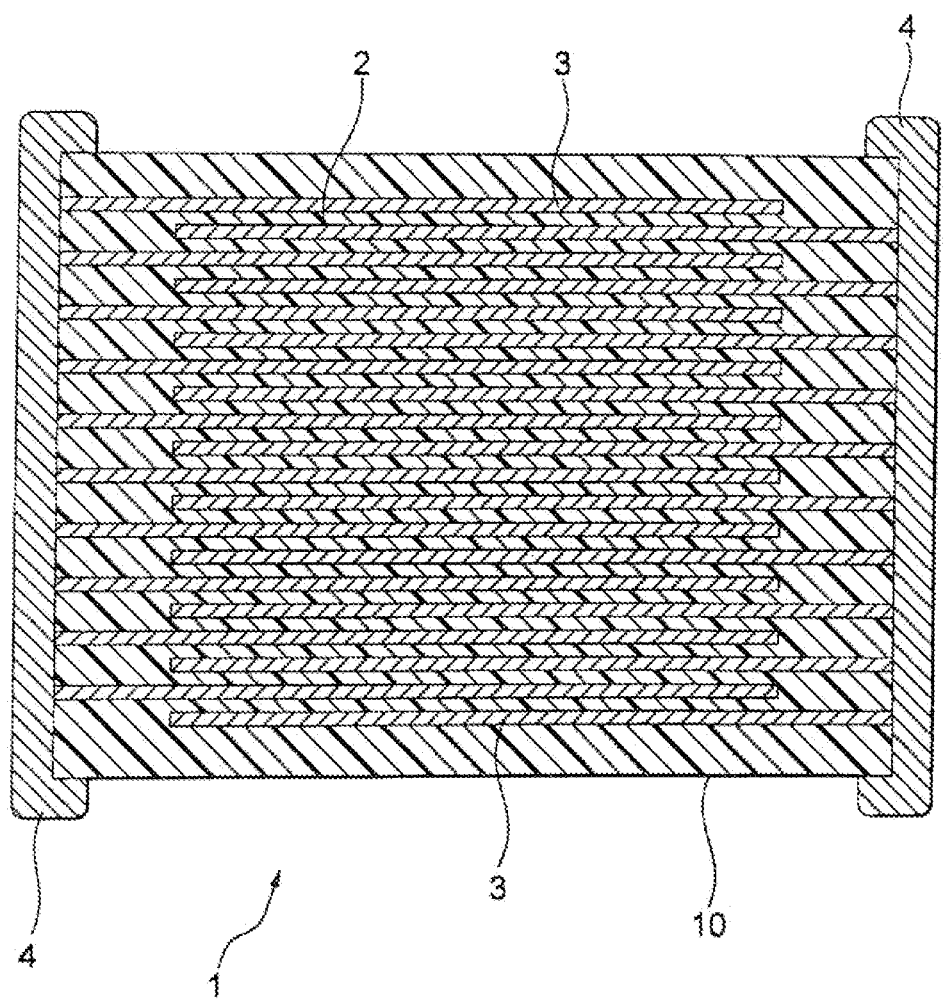
FIG. 1 is a cross-sectional view of a multilayer ceramic capacitor according to an embodiment of the present invention.

As shown in FIG. 1, a multilayer ceramic capacitor 1 as an example of electronic devices includes an element body 10 structured by alternately laminating dielectric layers 2 and internal electrode layers 3. The internal electrode layers 3 are laminated so that their end surfaces are alternately exposed to the two end surfaces of the element body 10 facing each other. A pair of external electrodes 4 is formed on both ends of the element body 10 and is connected to the exposed end surfaces of the internal electrode layers 3 alternately arranged to constitute a capacitor circuit.

In the present embodiment, a capacitance region is a region where the internal electrode layers 3 are laminated in a lamination direction while sandwiching the dielectric layers 2.

The element body 10 may have any have, but normally has a rectangular parallelepiped shape. The element body 10 may have any size.

Each of the dielectric layers 2 may have any thickness, but preferably has a thickness of 1.0 µm or more and 10.0 µm or less (more preferably, 2.0 µm or more and 5.0 µm or less). When each of the dielectric layers 2 has a thickness in the above-mentioned range, a predetermined amount of dielectric particles 20 mentioned below can be contained in a lamination direction of the dielectric layers 2.

The lamination number of dielectric layers 2 is not limited, but is preferably 10 or more, more preferably 50 or more, and still more preferably 100 or more. The upper limit of the lamination number is not limited, but is, for example, about 2000.

The conductive material contained in the internal electrode layers 3 is not limited, but can be a comparatively inexpensive base metal because the material constituting the dielectric layers 2 has reduction resistance. Preferably, the base metal used as the conductive material is Ni or a Ni alloy. Preferably, the Ni alloy is an alloy of Ni and one or more elements selected from Mn, Cr, Co, and Al. Preferably, the amount of Ni in the alloy is 95 mass % or more. Incidentally, Ni or the Ni alloy may contain various fine components, such as P, at about 0.1 mass % or less in total. Each of the internal electrode layers 3 may have any thickness appropriately changeable based on purpose, but normally has a thickness of about 0.1-3.0 µm and preferably has a thickness of about 0.5-2.0 µm.

The conductive material contained in the external electrodes 4 is not limited, but can be Ni, Cu, or an alloy of them, which are inexpensive, in the present embodiment. The thickness of each of the external electrodes 4 is appropriately determined based on purpose or so, but is preferably normally about 10-50 µm.

The dielectric layers 2 are composed of a dielectric ceramic composition according to the present embodiment. The main component of the dielectric ceramic composition according to the present embodiment is barium titanate.

The sub component of the dielectric ceramic composition according to the present embodiment is an oxide of an R element, an oxide of an M element, and an oxide containing Si.

The dielectric ceramic composition according to the present embodiment may further contain any other components, such as barium compound, based on desired characteristics.

In the present embodiment, the R element constituting the oxide of the R element is one or more elements selected from Eu, Gd, Tb, Dy, Y, Ho, and Yb and is preferably Gd, Dy, and/or Y. The R element may be one type or two or more types.

In the present embodiment, the M element constituting the oxide of the M element is one or more elements selected from Mg, Ca, Mn, V, and Cr and is preferably Mg, Mn, and/or V. The M element may be one type or two or more types.

In the present embodiment, the oxide containing Si is not limited and may be an oxide of, for example, $SiO_2$ or may be a composite oxide of Si and other elements, such as alkaline-earth metal elements. In the present embodiment, preferably, the oxide containing Si is $SiO_2$.

A ratio (CR:CSi) of an amount of the oxide of the R element (CR) in terms of oxide (in terms of $R_2O_3$) to an amount of the oxide containing Si (CSi) in terms of $SiO_2$ is 0.8:1: to 2.2:1.

A ratio (CM:CSi) of an amount of the oxide of the M element (CM) in terms of oxide (in terms of MO) to an amount of the oxide containing Si in terms of $SiO_2$ is 0.2:1 to 1.8:1, preferably 0.3:1 to 1:1.

In the dielectric ceramic composition according to the present embodiment, the oxide of the R element is contained preferably at 1.0 part by mol or more and 3.2 parts by mol or less, more preferably at 1.5 parts by mol or more and 3.2 parts by mol or less, in terms of $R_2O_3$ with respect to 100 parts by mol of barium titanate.

In the dielectric ceramic composition according to the present embodiment, preferably, the oxide of the M element is contained at 0.2 parts by mol or more and 1.6 parts by mol or less in terms of MO with respect to 100 parts by mol of barium titanate. In the dielectric ceramic composition according to the present embodiment, more preferably, the oxide of the M element is contained at 0.2 parts by mol or more and 1.0 part by mol or less in terms of oxide with respect to 100 parts by mol of barium titanate. As a result, the relative permittivity is improved.

In the dielectric ceramic composition according to the present embodiment, more preferably, the oxide of the M element is contained at 0.3 parts by mol or more and 1.0 part by mol or less in terms of MO with respect to 100 parts by mol of barium titanate. As a result, the high-temperature insulation specific resistance value is improved.

In the dielectric ceramic composition according to the present embodiment, the oxide containing Si is contained preferably at 0.8 parts by mol or more and 3.2 parts by mol or less, more preferably at 0.8 parts by mol or more and 2.0 parts by mol or less, in terms of $SiO_2$ with respect to 100 parts by mol of barium titanate.

Figure 2:
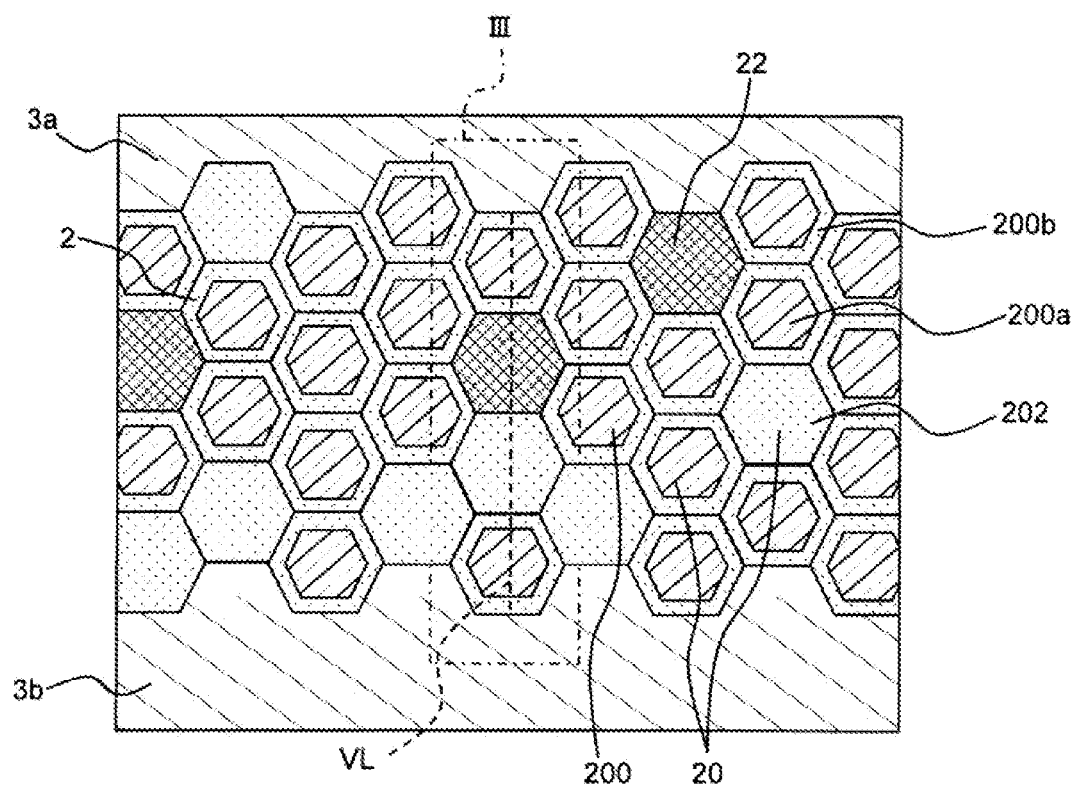
FIG. 2 is a schematic cross-sectional view of a capacitance region of a multilayer ceramic capacitor according to an embodiment of the present invention.

As mentioned above, the dielectric layers 2 according to the present embodiment are composed of the dielectric ceramic composition according to the present embodiment. As shown in FIG. 2, the dielectric layers 2 according to the present embodiment contain the dielectric particles 20 and may further contain segregation particles 22 formed by segregation of the sub component or so. Incidentally, the segregation particles 22 are not contained in the dielectric particles 20.

In the present embodiment, 50% or more of the number of dielectric particles 20 is core-shell dielectric particles 200 having a core shell structure. Except for the core-shell dielectric particles 200, the dielectric particles 20 may be complete-solid-solution dielectric particles 202.

In each of the core-shell dielectric particles 200, the sub component (at least one of the R element, the M element, and Si) exists only in a part (periphery) of the main component (barium titanate) particles. Specifically, each of the core-shell dielectric particles 200 is formed from a core portion 200a substantially composed of the main component and a shell portion 200b existing around the core portion 200a and containing the R element dispersed in the main component. That is, the core portions 200a are substantially composed of the main component, and the shell portions 200b are composed of the main component in which the element contained in the sub component is solid-soluted.

Incidentally, the core portions 200a are substantially composed of the main component, but may contain any other components, such as the sub component, at 0.0 mass % to 5.0 mass %. Incidentally, the concentration of any other components, such as the sub component, contained in the core portions 200a is lower than that of any other components, such as the sub component, contained in the shell portions 200b.

The core-shell dielectric particles 200 are determined by any method, but are determined by, for example, the following method.

A capacitor sample is cut on a surface perpendicular to the internal electrode layers 3, and the surface is thereafter etched. Then, the characteristic X-ray of each element is quantitatively analyzed for the dielectric layers 2 of the capacitor sample using TEM-EDS, and a mapping image of each element is obtained.

The TEM image and the TEM-EDS image are compared, and a particle whose Ba and Ti concentrations are higher than those of the surroundings is determined to be the dielectric particle 20. The boundary of the dielectric particle 20 is determined to be a grain boundary, and a particle whose concentration of the sub component is three times or higher than that of the dielectric particle 20 is determined to be the segregation particle 22.

The obtained characteristic X-ray of the R element is quantitatively analyzed to obtain a mapping image of the R element.

In the observation with 30 or more (preferably, 30-200) dielectric particles 20 existing in a visual field, a region whose brightness is 30% or more of a maximum value of the brightness of the R element in portions excluding the segregation particles 22 is determined to be the shell portion 200b. The dielectric particle 20 whose area of the shell portion 200b to that of the dielectric particle 20 is 95% or less may be determined to be the core-shell dielectric particle 200.

Incidentally, when the area of the shell portion 200b to that of the dielectric particle 20 is more than 95%, the dielectric particle 20 may be determined to be the complete-solid-solution dielectric particle 202. In the complete-solid-solution dielectric particle 202, the sub component exists while being dispersed into the whole of the main component particle and solid-soluted.

In the present embodiment, 50% or more of the number of dielectric particles 20 in the above-mentioned visual field is the core-shell dielectric particles 200.

In addition to barium titanate and the sub component, the dielectric particles 20 containing the core-shell dielectric particles 200 and the complete-solid-solution dielectric particles 202 may contain a component based on desired characteristics.

In addition to the sub component, the segregation particles 22 may also contain a component based on desired characteristics.

Figure 3:
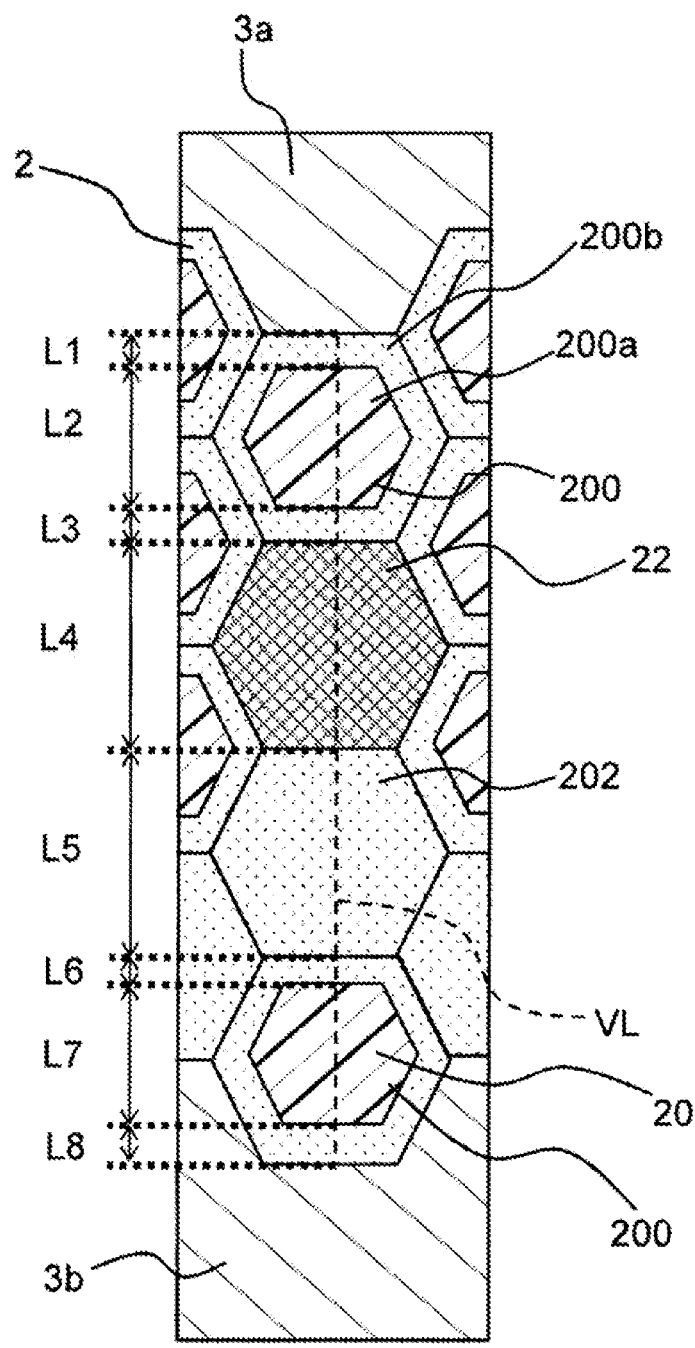
FIG. 3 is an enlarged cross-sectional view of the III part of FIG. 2.

In the present embodiment, as shown in FIG. 2 and FIG. 3, a line segment VL, which is a virtual line perpendicular to the internal electrode layers 3 (electrodes), is drawn for the dielectric layers 2. In other words, the line segment VL is parallel to the lamination direction of the dielectric layers 2 and the internal electrode layers 3 and is parallel to a direction to which voltage is applied.

The line segment VL starts at the boundary between the dielectric layer 2 and the internal electrode layer 3 and ends at the boundary between the dielectric layer 2 and the other internal electrode layer 3 with which the dielectric layer 2 is contacted. In the present embodiment, the length of the line segment VL is LA. In other words, LA is a length of the line segment perpendicular to the internal electrode layers 3 and extending from the boundary between the dielectric layer 2 and either one of the internal electrode layers 3 to the boundary between the dielectric layer 2 and the other one of the internal electrode layers 3.

In the present embodiment, LB is a total length of the shell portions 200b and the complete-solid-solution dielectric particles 202 on the line segment VL. Specifically, this is explained with FIG. 3. In the line segment VL of FIG. 3, L1 is the shell portion 200b, L2 is the core portion 200a, L3 is the shell portion 200b, L4 is the segregation particle 22, L5 is the complete-solid-solution dielectric particles 202, L6 is the shell portion 200b, L7 is the core portion 200a, and L8 is the shell portion 200b. Thus, "LB=L1+L3+L5+L6+L8" is satisfied.

In the present embodiment, a ratio (LB/LA) of LB to LA is preferably 0.2 or more and 0.9 or less and is more preferably 0.3 or more and 0.9 or less.

In FIG. 3, two core-shell dielectric particles 200 and one complete-solid-solution dielectric particles 202 exist along the line segment VL between the dielectric layers 2, and three dielectric particles 20 thereby exist in total, but the number of dielectric particles 20 between the dielectric layers 2 is not limited. Preferably, when 10 segment lines VL are drawn at constant intervals, the average number of dielectric particles 20 is 3-50.

In the present embodiment, LB/LA is determined by any method and can be determined by, for example, the following method.

Figure 4:
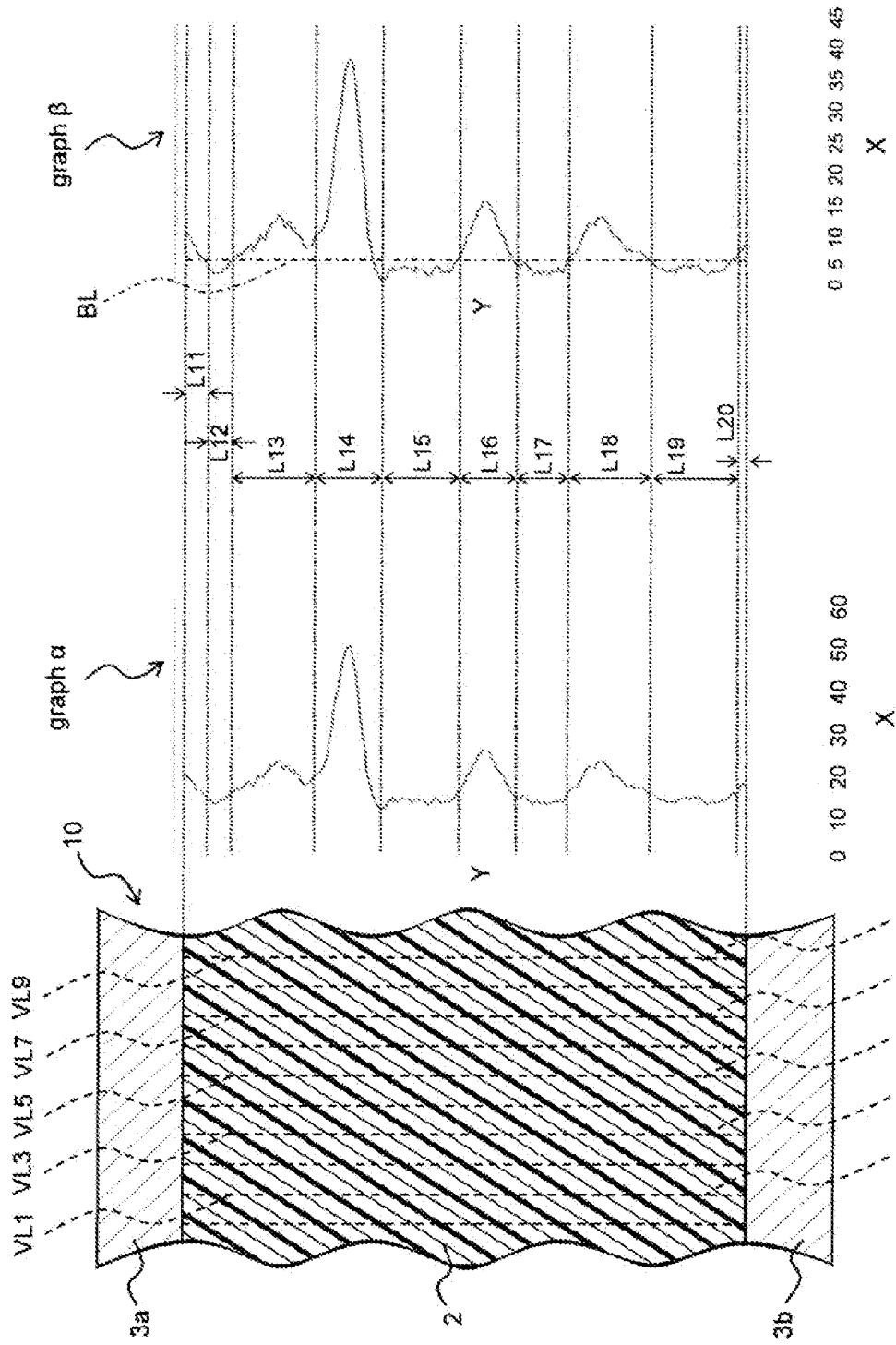
FIG. 4 is an explanatory view for explaining a measurement of (LB/LA) of the present invention.

First of all, as shown in FIG. 4, the element body 10 is polished perpendicularly to internal electrode layers 3a and 3b and etched to expose the dielectric layer 2 sandwiched by the pair of internal electrode layers 3a and 3b.

In the dielectric layer 2 sandwiched by the pair of internal electrode layers 3a and 3b, 10-100 line segments VL are drawn perpendicularly to the internal electrode layers 3a and 3b from the boundary between the internal electrode layer 3a and the dielectric layer 2 to the boundary between the other internal electrode layer 3b contacted with the dielectric layer 2 and the dielectric layer 2. In other words, the above-mentioned number of line segments VL perpendicular to the internal electrode layers 3 and extending from the boundary between the dielectric layer 2 and either one of the internal electrode layers 3 to the boundary between the dielectric layer 2 and the other one of the internal electrode layers 3. In FIG. 4, 10 line segments VL (VL1 to VL10) are drawn. The length of each line segment VL is LA. Preferably, the intervals of VL are constant and 0.1-0.5 μm.

As shown in the graph α of FIG. 4, the brightness of the R element on the line segments VL is measured and graphed. In the graph α of FIG. 4, the X-axis indicates a measurement position along the line segments VL, and the Y-axis indicates a brightness of the R element. The brightness of the R element on the Y-axis is a value proportional to the amount of the R element at an optional point and has a dimensionless unit. Incidentally, the graph α in FIG. 4 is smoothed. Preferably, the graph a is smoothed.

Only one graph α is described in FIG. 4, but since 10 line segments VL (VL1 to VL10) are drawn, 10 graphs α are formed. Incidentally, the graph α of FIG. 4 and a graph β mentioned below are related to VL1.

Next, a minimum value of the concentration of the R element is obtained in each line segment VL, and its average value (average Rmin) is calculated.

Each graph β is formed by subtracting the background (average Rmin) from each graph α.

Next, a maximum value of the brightness of the R element in the graph β at each line segment VL is obtained, and its average value (average Rmax) is calculated. At this time, when the segregated particle 22 is on the line segment VL, a maximum value of the brightness of the R element in the section excluding the segregation particle 22 is obtained, and its average value (average Rmax) is calculated.

Whether or not the segregation particle 22 is on the line segment VL can be determined by, for example, the following method. First of all, an average value of the brightness of the R element is obtained in each graph (3. With a peak value (three times as large as the average value) as a center, a region in a boundary of an adjacent downwardly convex portion or a shoulder portion of the peak value can be determined to be the segregation particle 22. In the graph β of FIG. 4, for example, the section of L14 may be determined to be the segregation particle 22.

In the graph β of FIG. 4, a point with average Rmax×0.3 is indicated by the straight line BL. In the present embodiment, a portion with average Rmax×0.3 or more and without the segregation particle 22 is determined to be the shell portion 200b or the complete-solid-solution dielectric particle 202, and its total can be LB. Specifically, in the graph β, LB can be obtained by a formula of LB=L11+L13+L16+L18+L20.

Each of LA and LB is obtained in such a manner. Then, LB/LA can be calculated.

In the present embodiment, L12, L15, L17, and L19 may be determined to be the core portions 200b.

In the present embodiment, preferably, the dielectric particles 20 have an average particle size of 0.15 µm or more and 0.30 µm or less. As a result, the multilayer ceramic capacitor according to the present embodiment has better temperature characteristics.

The average particle size of the dielectric particles 20 is adjusted by any method and can be adjusted by, for example, changing the average particle size of the main component particles or changing the holding temperature during firing.

Multilayer ceramic capacitors for automobiles, which are expected to be used in high temperature environments, are required to have good capacitance temperature characteristics. Meanwhile, as the electrification of automobiles progresses, the demand for reliability of the multilayer ceramic capacitors is presently increasing, and multilayer ceramic capacitors having high reliability in high temperature and high electric field are required. However, there is a trade-off relation between good temperature characteristics and high reliability, and it is difficult to achieve both of them.

Since the dielectric ceramic composition according to the present embodiment has the above-mentioned structure, the electronic component, such as the multilayer ceramic capacitor 1 including the dielectric ceramic composition, has a good temperature characteristic and also has a high high-temperature load life time, namely, reliability in high temperature and high electric field.

The reason is not necessarily clear, but the following respects can be conceived.

In the present embodiment, the R element, which normally replaces the Ba site of barium titanate, acts as a donor component by solid solution into the dielectric particles, and the reliability of the dielectric ceramic composition tends to be improved. The M element, which replaces the Ti site of barium titanate, acts as an acceptor component by solid solution into the dielectric particles, and the high temperature insulation specific resistance of the dielectric ceramic composition tends to be improved. Then, the reliability is most improved with an appropriate ratio between the donor component and the acceptor component.

The solid solution amount of the R element and the M element in the dielectric particles is closely related to the temperature characteristic of the dielectric ceramic composition. The temperature characteristic is most improved with an appropriate solid solution amount of the R element and the M element.

First of all, it is considered that the oxide of the R element can efficiently be solid-soluted into the dielectric particles 20 with (CR:CSi) in the above-mentioned range. This is because the oxide of the R element tends to easily mainly replace the Ba site of barium titanate in the dielectric particles 20, and the Si element acts to promote the sintering of the dielectric particles. In (CR:CSi), when (CR) is in the above-mentioned range without exceeding it, the sintering of the dielectric particles 20 tends to be promoted. In (CR:CSi), when (CR) is in the above-mentioned range without being under it, the solid solution amount of the R element in the dielectric particles 20 can be appropriate. For the above-mentioned reasons, it is considered that the multilayer ceramic capacitor 1 according to the present embodiment can have high reliability in high temperature and high electric field.

Moreover, it is considered that the oxide of the M element can efficiently be solid-soluted into the dielectric particles 20 with (CM:CSi) in the above-mentioned range. This is because the oxide of the M element tends to easily mainly replace the Ti site of barium titanate in the dielectric particles 20, and the Si element acts to promote the sintering of the dielectric particles. In (CM:CSi), when (CM) is in the above-mentioned range, the solid solution amount of the R element and the M element in the dielectric particles 20 can be appropriate. As a result, it is considered that the multilayer ceramic capacitor 1 according to the present embodiment can have good temperature characteristic. In particular, when the ratio of the oxide of the M element to the oxide containing Si is in the above-mentioned range, the temperature characteristic is better as compared with when (CM) of (CM:CSi) is under the above-mentioned range.

In the present embodiment, as mentioned above, when each of (CR:CSi) and (CM:CSi) is in the above-mentioned range, it is possible to appropriately adjust the amounts of the element for replacing the Ba site and the element for replacing the Ti site in barium titanate. Thus, the dielectric ceramic composition according to the present embodiment can have the core-shell dielectric particles 200 having a certain amount of the shell portions 200b whose donor component and acceptor component are balanced and can achieve both of good temperature characteristic and high reliability.

Moreover, when LB/LA is in the above-mentioned range, solid solution portions of the sub component (the shell portion 200b and the complete-solid-solution dielectric particle 202) exist in the electric field direction in the dielectric layers 2, and the multilayer ceramic capacitor 1 according to the present embodiment thereby has higher reliability. From the above-mentioned point of view, preferably, the line segment VL is an optional line segment perpendicular to the internal electrode layers 3 and extending from the boundary between the dielectric layers 2 and either one of the internal electrode layers 3 to the boundary between the dielectric layers 2 and the other one of the internal electrode layers 3. As a result, the solid solution portions (the shell portion 200b and the complete-solid-solution dielectric particle 202) of the sub component always exist in the electric field direction in the dielectric layers 2, and the multilayer ceramic capacitor 1 according to the present embodiment thereby has higher liability.

When LB/LA is in the above-mentioned range, the temperature characteristic is better than when LB/LA exceeds the above-mentioned range.

In the present embodiment, as mentioned above, the average particle size of the dielectric particles 200 is in the above-mentioned range, and a good temperature characteristic can thereby be exhibited while maintaining a high relative permittivity.

When the average particle size of the dielectric particles 200 is in the above-mentioned range, the relative permittivity tends to be higher than when the average particle size of the dielectric particles 200 is under the above-mentioned range. When the average particle size of the dielectric particles 200 is in the above-mentioned range, the temperature characteristic tends to be better than when the average particle size of the particles 200 exceeds the above-mentioned range.

In high temperature and high electric field, the insulation resistance value of the multilayer ceramic capacitor 1 decreases, and there is a concern about the influence of Joule heat generation. Thus, it is desirable to maintain a high insulation specific resistance even in high temperature and high electric field.

In the dielectric ceramic composition according to the present embodiment, more preferably, the oxide of the M element is contained at 0.3 parts by mol or more and 1.0 part by mol or less in terms of oxide with respect to 100 parts by mol of barium titanate. As a result, the high-temperature insulation specific resistance value is improved.

(Method of Manufacturing Multilayer Ceramic Capacitor)

As with conventional multilayer ceramic capacitors, the multilayer ceramic capacitor 1 according to the present embodiment is manufactured by preparing a green chip with a normal printing method or a sheet method using a paste, firing the green chip, printing or transferring an external electrode, and firing it. Hereinafter, a method of manufacturing the multilayer ceramic capacitor 1 is specifically explained.

First of all, a dielectric raw material (dielectric ceramic composition powder) is prepared and turned into a paint to prepare a paste for forming the dielectric layers (a dielectric-layer paste).

As the dielectric raw material, prepared are a raw material of barium titanate as a main component and raw materials of an oxide of an R element, an oxide of an M element, and an oxide containing Si. As these raw materials, oxides of the above-mentioned components, their mixtures, and composite oxides can be used, but in addition, it is possible to use a mixture appropriately selected from various compounds to be the above-mentioned oxides, composite oxides, or the like by firing, such as carbonates, oxalates, nitrates, hydroxides, and organometallic compounds.

When a barium titanate represented by $Ba_uTi_vO_3$ is used, u/v is not limited, but is preferably in the range of $0.995 \leq u/v \leq 1.015$.

In addition to what is called solid-phase methods, the barium titanate according to the present embodiment can be manufactured by various methods, such as various liquid phase methods (e.g., oxalate method, hydrothermal synthesis method, alkoxide method, sol-gel method).

The amount of each compound in the dielectric raw material is determined so as to have the composition of the above-mentioned dielectric ceramic composition after firing. In order that the fired dielectric particles are within a predetermined range, preferably, the barium titanate particles have a particle size of 100 nm to 250 nm.

The dielectric-layer paste may be an organic paint obtained by kneading the dielectric raw material and an organic vehicle or may be an aqueous paint obtained by kneading the dielectric raw material and an aqueous vehicle.

The organic vehicle is a binder dissolved in an organic solvent. The binder is not limited and is appropriately selected from various binders used in general organic vehicles, such as ethyl cellulose and polyvinyl butyral. The organic solvent to be used is not limited either and is appropriately selected from various organic solvents, such as terpineol, butyl carbitol, acetone, and toluene, based on the method to be used, such as printing method and sheet method.

The aqueous vehicle is a water-soluble binder, a dispersant, or the like dissolved in water. The water-soluble binder used for the aqueous vehicle is not limited is appropriately selected from various binders used for general aqueous vehicles, such as polyvinyl alcohol, cellulose, and water-soluble acrylic resin.

An internal-electrode-layer paste is prepared by kneading the above-mentioned organic vehicle and various oxides, organometallic compounds, resinates, or the like to be a conductive material made of the above-mentioned various conductive metals or alloys or to be the above-mentioned conductive material after firing. The internal-electrode-layer paste may contain an inhibitor. The inhibitor is not limited, but preferably has a similar composition to the main component.

An external-electrode paste is prepared similarly to the above-mentioned internal-electrode-layer paste.

The amount of the organic vehicle in each of the above-mentioned pastes is not limited and is a normal amount, such as about 1-10 mass % for the binder and about 10-50 mass % for the solvent. If necessary, each paste may contain an additive selected from various dispersants, plasticizers, dielectrics, insulators, and the like. Preferably, their total amount is 10 mass % or less.

When the printing method is used, the dielectric-layer paste and the internal-electrode-layer paste are printed and laminated on a substrate, such as PET, cut into a predetermined shape, and thereafter peeled from the substrate to obtain a green chip.

When the sheet method is used, green sheets are formed using the dielectric-layer paste, and the internal-electrode-layer paste is printed on the green sheets to form an internal electrode pattern. Then, these are laminated to form a green chip.

(Binder Removal Conditions)

The binder removal conditions are not limited, but the heating rate is preferably 5-300° C./hour, the holding temperature is preferably 180-400° C., and the temperature holding time is preferably 0.5-48 hours. Preferably, the atmosphere of the binder removal is the air or a reducing atmosphere.

(Firing Conditions)

After removing the binder, the green chip is fired. The firing conditions are not limited, but the heating rate is preferably 100-10000° C./hour. The holding temperature during firing is preferably 1350° C. or lower, more preferably 1150-1280° C., and the holding time during firing is preferably 0.5-20 hours, more preferably 1.0-15 hours. When the holding temperature is in the above-mentioned range, the material constituting the internal electrode layers 3 can be prevented from diffusing, and the temperature characteristic is further improved.

Preferably, the firing atmosphere is a reducing atmosphere. The atmospheric gas is not limited and can be, for example, a humidified mixed gas of $N_2$ and $H_2$.

The partial pressure of oxygen during firing is appropriately determined based on the type of the conductive material in the internal-electrode paste, but when the conductive material is a base metal such as Ni and Ni alloy, the partial pressure of oxygen in the firing atmosphere is preferably $10^{-14}$ to $10^{-9}$ MPa. The cooling rate is not limited, but is preferably 50-10000° C./hour.

(Annealing Conditions)

After the firing in a reducing atmosphere, the element body 10 is preferably annealed. Annealing is a treatment for reoxidizing the dielectric layers 2 and can remarkably increase the insulation resistance (IR) of the dielectric layers 2 and further improve the reliability (IR lifetime).

The atmosphere of annealing is not limited, but the partial pressure of oxygen is preferably $10^{-9}$ to $10^{-5}$ MPa.

The holding temperature during annealing is not limited, but is preferably 1100° C. or lower, particularly preferably 950-1090° C. When the holding temperature is in the above-mentioned range, the dielectric layers 2 are sufficiently oxidized to the extent that they are not overoxidized, and the insulation resistance (IR), reliability (IR lifetime), and temperature characteristic of the dielectric layers 2 are further improved. The annealing step may consist only of a heating process and a cooling process. That is, the temperature holding time may be zero. In this case, the holding temperature is the same as the maximum temperature.

As the annealing conditions other than the above-mentioned ones, the temperature holding time is preferably 0-20 hours, more preferably 2-4 hours, and the cooling rate is preferably 50-1000° C./hour, more preferably 100-600° C./hour. The annealing atmosphere gas is not limited, but is preferably, for example, a humidified $N_2$ gas.

In the above-mentioned binder removal treatment, firing, and annealing, for example, a wetter or so is used to humidify the $N_2$ gas, the mixed gas, and the like. When a wetter is used, the water temperature is preferably about 5-75° C.

The binder removal treatment, the firing, and the annealing may be carried out continuously or independently.

The dielectric ceramic composition constituting the dielectric layers 2 of the element body 10 obtained as mentioned above is the above-mentioned dielectric ceramic composition. The end surfaces of the element body 10 are polished, and the external-electrode paste is applied thereon and fired to form the external electrode 4. Then, if necessary, a coverage layer is formed on the surface of the external electrode 4 by plating or so.

Accordingly, the multilayer ceramic capacitor 1 according to the present embodiment is manufactured.

Hereinbefore, an embodiment of the present invention is explained, but the present invention is not limited to the above-mentioned embodiment and may be modified to various embodiments within the scope of the present invention.

For example, the electronic device according to the present invention is a multilayer ceramic capacitor in the above-mentioned embodiment, but is not limited to multilayer ceramic capacitors and may be any electronic device including the above-mentioned dielectric ceramic composition.

For example, the electronic device according to the present invention may be a single plate type ceramic capacitor in which a pair of electrodes is formed on the above-mentioned dielectric ceramic composition.

(Experiment 1)

In Experiment 1, an experiment related to Examples 1-7 and Comparative Examples 1-4 was carried out.

A $Ba_uTi_vO_3$ powder (u/v=1.004) whose average particle size was 200 nm was prepared as a main component. A $Dy_2O_3$ powder was prepared as a raw material of an oxide of an R element. A mixture of a MgO powder, a $MnCO_3$ powder, and a $V_2O_5$ powder was prepared as a raw material of an oxide of an M element. A $SiO_2$ powder was prepared as a raw material of an oxide containing Si.

Next, each raw material powder prepared above was weighed to the amount shown in Table 1, mixed in wet manner and pulverized with a ball mill for 20 hours, and dried to obtain a dielectric raw material. $MnCO_3$ would be contained in a dielectric ceramic composition as MnO after firing.

Next, the obtained dielectric raw material: 100 parts by mass, polyvinyl butyral resin: 10 parts by mass, dioctyl phthalate (DOP) as a plasticizer: 5 parts by mass, and alcohol as a solvent: 100 parts by mass were mixed with a ball mill and turned into a dielectric-layer paste.

Apart from the above, Ni particles: 44.6 parts by mass, terpineol: 52 parts by mass, ethyl cellulose: 3 parts by mass, and benzotriazole: 0.4 parts by mass were kneaded with a three roll and turned into an internal-electrode-layer paste.

Then, using the above-prepared dielectric-layer paste, a green sheet was formed on a PET film so that the thickness after drying would be 4.5 μm. Next, an electrode layer was printed in a predetermined pattern using the internal-electrode-layer paste on the green sheet, and the sheet was thereafter peeled off from the PET film to obtain a green sheet having an electrode layer (internal electrode pattern). Next, a plurality of green sheets having the electrode layer was laminated and bonded with pressure to form a green laminated body. This green laminated body was cut into a predetermined size to obtain a green chip.

Next, the obtained green chip was subjected to binder removal treatment, firing, and annealing with the following conditions to obtain a multilayer ceramic fired body.

As the binder removal treatment conditions, the heating rate was 25° C./hour, the holding temperature was 235° C., the holding time was 8 hours, and the atmosphere was the air.

As the firing conditions, the heating rate was 200° C./hour, the holding temperature was 1240° C., and the holding time was 2 hours. The cooling rate was 200° C./hour. The atmospheric gas was a humidified $N_2+H_2$ mixed gas, and the partial pressure of oxygen was $10^{-10}$ MPa.

As the annealing conditions, the heating rate was 200° C./hour, the holding temperature was 1050° C., the holding time was 3 hours, the cooling rate was 200° C./hour, the atmospheric gas was a humidified $N_2$ gas (partial pressure of oxygen: $10^{-7}$ MPa).

A wetter was used to humidify the atmospheric gas during firing and annealing.

After the end surfaces of the obtained laminated ceramic fired body was subjected to barrel polishing, a Cu paste was applied as an external electrode and fired in a reducing atmosphere to obtain a sample of the multilayer ceramic capacitor shown in FIG. 1. The size of the sample of the obtained capacitor was 3.2 mm×1.6 mm×0.7 mm. The interlayer thickness of the dielectric layers was 3.0 µm. The internal electrode thickness was 1.0 µm. The number of dielectric layers was 10.

For the obtained capacitor sample, the existence of a core-shell structure was determined by the following method, and the temperature characteristic and the high-temperature load lifetime were measured by the following method.

(Ratio of Core-Shell Dielectric Particles in Dielectric Particles)

After the capacitor sample was cut on a surface perpendicular to the internal electrode layers, the surface was etched. Next, the dielectric layers of the capacitor sample were quantitatively analyzed by characteristic X-ray of each element using TEM-EDS to obtain a mapping image of each element. The TEM image and the TEM-EDS image were compared, and a particle whose concentrations of Ba and Ti were higher than those of the surroundings was determined to be the dielectric particle 20.

The characteristic X-ray of the obtained R element was quantitatively analyzed to obtain a mapping image of the R element.

In the observation with 30 or more dielectric particles existing in the visual field, a dielectric particle whose brightness was 30% or more of a maximum value of the brightness of the R element in portions excluding the segregation particles and whose area of the shell portion to the area of the dielectric particle was 95% or less was determined to be a core-shell dielectric particle.

Table 2 shows a ratio of the number of core-shell dielectric particles to the number of dielectric particles in the visual field.

(X7S Characteristic (Capacity Change Rate at 125° C. (Temperature Characteristic)))

For the capacitor sample, with conditions of 1.0 kHz (frequency) and 1.0 Vrms (input signal level (measurement voltage)), the capacitance at −55° C. to 125° C. was measured, the change rate ΔC of the capacitance was calculated based on the capacitance at 25° C., and whether or not the X7S characteristic (the temperature characteristic of the EIA standard) was satisfied was evaluated. In the present example, whether or not the capacity change rate ΔC on the higher temperature side (125° C.) was within ±22% was evaluated. If the capacity change rate at 125° C. satisfies ±22%, the capacity change rate at −55° C. can also satisfy the X7S characteristic. The results are shown in Table 2.

((MTTF (High-Temperature Load Lifetime))

For the capacitor sample, the high-temperature load lifetime was evaluated by holding an application state of the DC voltage at 200° C. under 40 V/µm (electric field) and measuring an insulation deterioration time of the capacitor sample. In the present example, the time from the beginning of voltage application until the insulation resistance drop by an order of magnitude was defined as a lifetime. In the present example, the above-mentioned evaluation was performed for 20 capacitor samples, and a mean time to failure (MTTF) calculated by performing Weibull analysis for the evaluation was defined as an average lifetime of the capacitor samples. In the present example, an average lifetime of 5 hours or more was considered to be good, and an average lifetime of 7 hours or more was particularly good. The results are shown in Table 2.

(Determination)

A case where the ratio of the core-shell dielectric particles was 50% or more, the temperature characteristic satisfied the X7S characteristic, and the high-temperature load lifetime was 7 hours or more was determined to be "A", a case where the ratio of the core-shell dielectric particles was 50% or more, the temperature characteristic satisfied the X7S characteristic, and the high-temperature load lifetime was 5 hours or more and less than 7 hours was determined to be "B", and the other cases were determined to be "C". The results are shown in Table 2.

TABLE 1

|  | Ratio of $R_2O_3$:$SiO_2$ | Ratio of MO:$SiO_2$ | R (in terms of $R_2O_3$) [parts by mol] | M (in terms of MO) [parts by mol] | $SiO_2$ [parts by mol] |
|---|---|---|---|---|---|
| Ex. 1 | 1.5:1 | 0.5:1 | 3.00 | 1.00 | 2.0 |
| Ex. 2 | 0.8:1 | 0.5:1 | 1.60 | 1.00 | 2.0 |
| Ex. 3 | 2.2:1 | 0.5:1 | 4.40 | 1.00 | 2.0 |
| Ex. 4 | 1.5:1 | 0.2:1 | 1.50 | 0.20 | 1.0 |
| Ex. 5 | 1.5:1 | 1.8:1 | 1.50 | 1.80 | 1.0 |
| Ex. 6 | 1.5:1 | 1.0:1 | 1.50 | 1.00 | 1.0 |
| Ex. 7 | 1.5:1 | 0.3:1 | 1.50 | 0.30 | 1.0 |
| Comp. Ex. 1 | 0.7:1 | 0.7:1 | 1.40 | 1.40 | 2.0 |
| Comp. Ex. 2 | 2.3:1 | 0.7:1 | 4.60 | 1.40 | 2.0 |
| Comp. Ex. 3 | 1.5:1 | 0.15:1 | 3.00 | 0.15 | 1.0 |
| Comp. Ex. 4 | 1.5:1 | 1.9:1 | 3.00 | 1.90 | 1.0 |

TABLE 2

|  | Ratio of Core-Shell Dielectric Particles in Dielectric Particles | X7S Characteristic | MTTF [h] | Determination |
|---|---|---|---|---|
| Ex. 1 | 50% or more | OK | 7.4 | A |
| Ex. 2 | 50% or more | OK | 7 | A |
| Ex. 3 | 50% or more | OK | 5.2 | B |
| Ex. 4 | 50% or more | OK | 7.1 | A |
| Ex. 5 | 50% or more | OK | 5.2 | B |
| Ex. 6 | 50% or more | OK | 6.9 | B |
| Ex. 7 | 50% or more | OK | 7.8 | A |
| Comp. Ex. 1 | 50% or more | OK | 4.9 | C |
| Comp. Ex. 2 | 50% or more | OK | 4.6 | C |
| Comp. Ex. 3 | 50% or more | NG | 5.9 | C |
| Comp. Ex. 4 | 50% or more | OK | 4.4 | C |

(Experiment 2)

In Experiment 2, an experiment related to Comparative Example 5 was carried out.

In Comparative Example 5, a multilayer ceramic capacitor sample was prepared in a similar manner to Example 1 except that the holding temperature during firing was 1280° C., and the characteristics were evaluated similarly to Experiment 1.

TABLE 3

|  | Ratio of $R_2O_3$:$SiO_2$ | Ratio of MO:$SiO_2$ | R (in terms of $R_2O_3$) [parts by mol] | M (in terms of MO) [parts by mol] | $SiO_2$ [parts by mol] |
|---|---|---|---|---|---|
| Ex. 1 | 1.5:1 | 0.5:1 | 3.00 | 1.00 | 2.00 |
| Comp. Ex. 5 | 1.5:1 | 0.5:1 | 3.00 | 1.00 | 2.00 |

TABLE 4

|  | Ratio of Core-Shell Dielectric Particles in Dielectric Particles | X7S Characteristic | MTTF [h] | Determination |
|---|---|---|---|---|
| Ex. 1 | 50% or more | OK | 7.4 | BA |
| Comp. Ex. 5 | less than 50% | NG | 6.3 | C |

Table 1 and Table 2 show that when the ratio of the amount of the oxide of the R element in terms of $R_2O_3$ to the amount of the oxide containing Si in terms of $SiO_2$ was 0.8:1 to 2.2:1; the ratio of the amount of the oxide of the M element in terms of MO to the amount of the oxide containing Si in terms of $SiO_2$ was 0.2:1 to 1.8:1; and the ratio of the core-shell dielectric particles was 50% or more (Examples 1-7), the high-temperature load lifetime was higher than that when the ratio of the amount of the oxide of the R element in terms of $R_2O_3$ to the amount of the oxide containing Si in terms of $SiO_2$ was out of 0.8:1 to 2.2:1 (Comparative Examples 1 and 2) and when the ratio of the amount of the oxide of the M element in terms of MO to the amount of the oxide containing Si in terms of $SiO_2$ was more than 0.2:1 to 1.8:1 (Comparative Example 4).

Table 1 to Table 4 show that when the ratio of the amount of the oxide of the R element in terms of $R_2O_3$ to the amount of the oxide containing Si in terms of $SiO_2$ was 0.8:1 to 2.2:1; the ratio of the amount of the oxide of the M element in terms of MO to the amount of the oxide containing Si in terms of $SiO_2$ was 0.2:1 to 1.8:1; and the ratio of the core-shell dielectric particles was 50% or more (Examples 1-7), the temperature characteristic was better than that when the ratio of the amount of the oxide of the M element in terms of MO to the amount of the oxide containing Si in terms of $SiO_2$ was less than 0.2:1 to 1.8:1 (Comparative Example 3) or when the ratio of the core-shell dielectric particles was less than 50%, and the X7S characteristic was satisfied.

(Experiment 3)

In Experiment 3, a multilayer ceramic capacitor sample was prepared in a similar manner to Example 1 except that the type of R element was changed, and the characteristics were evaluated similarly to Experiment 1.

TABLE 5

|  | Ratio of $R_2O_3$:$SiO_2$ | Ratio of MO:$SiO_2$ | R (in terms of $R_2O_3$) [parts by mol] | M (in terms of MO) [parts by mol] | $SiO_2$ [parts by mol] | Rare Earth |
|---|---|---|---|---|---|---|
| Ex. 1 | 1.5:1 | 0.5:1 | 3.00 | 1.00 | 2.00 | $Dy_2O_3$ |
| Ex. 8 | 1.5:1 | 0.5:1 | 3.00 | 1.00 | 2.00 | $Gd_2O_3$ |
| Ex. 9 | 1.5:1 | 0.5:1 | 3.00 | 1.00 | 2.00 | $Y_2O_3$ |
| Ex. 10 | 1.5:1 | 0.5:1 | 2.50(Dy), 0.50(Yb) | 1.00 | 2.00 | $Dy_2O_3$, $Yb_2O_3$ |

TABLE 6

|  | Ratio of Core-Shell Dielectric Particles in Dielectric Particles | X7S Characteristic | MTTF [h] | Determination |
|---|---|---|---|---|
| Ex. 1 | 50% or more | OK | 7.4 | A |
| Ex. 8 | 50% or more | OK | 7.5 | A |
| Ex. 9 | 50% or more | OK | 6.3 | B |
| Ex. 10 | 50% or more | OK | 6.6 | B |

Table 5 and Table 6 show that even when the R element was changed to Gd (Example 8), to Y (Example 9), and to Dy and Yb (Example 10), the X7S characteristic was satisfied, and the high-temperature load lifetime was high.

(Experiment 4)

In Experiment 4, an experiment related to Examples 11-24 was carried out.

In Experiment 4, a multilayer ceramic capacitor sample was prepared in a similar manner to Experiment 1 except that each amount of the oxide of the R element, the oxide of the M element, and $SiO_2$ was set as shown in Table 7, and the characteristics were evaluated similarly to Experiment 1. The results are shown in Table 8.

TABLE 7

|  | Ratio of $R_2O_3$:$SiO_2$ | Ratio of MO:$SiO_2$ | R (in terms of $R_2O_3$) [parts by mol] | M (in terms of MO) [parts by mol] | $SiO_2$ [parts by mol] |
|---|---|---|---|---|---|
| Ex. 11 | 2.2:1 | 0.5:1 | 3.20 | 0.73 | 1.45 |
| Ex. 12 | 1.5:1 | 0.5:1 | 2.20 | 0.73 | 1.47 |
| Ex. 13 | 0.8:1 | 0.5:1 | 1.20 | 0.75 | 1.50 |
| Ex. 4 | 1.5:1 | 0.2:1 | 1.50 | 0.20 | 1.00 |
| Ex. 14 | 1.5:1 | 0.7:1 | 1.71 | 0.80 | 1.14 |
| Ex. 15 | 1.5:1 | 1.4:1 | 1.71 | 1.60 | 1.14 |
| Ex. 16 | 1.5:1 | 0.5:1 | 1.20 | 0.40 | 0.80 |
| Ex. 17 | 1.0:1 | 0.5:1 | 2.00 | 1.00 | 2.00 |
| Ex. 18 | 1.0:1 | 0.5:1 | 3.20 | 1.60 | 3.20 |
| Ex. 19 | 2.0:1 | 0.5:1 | 3.30 | 0.83 | 1.65 |
| Ex. 20 | 2.0:1 | 0.5:1 | 0.90 | 0.23 | 0.45 |
| Ex. 21 | 2.0:1 | 0.2:1 | 1.50 | 0.15 | 0.75 |
| Ex. 22 | 2.0:1 | 1.5:1 | 2.27 | 1.70 | 1.13 |
| Ex. 23 | 2.0:1 | 0.4:1 | 1.40 | 0.28 | 0.70 |
| Ex. 24 | 0.8:1 | 0.4:1 | 2.64 | 1.32 | 3.30 |

TABLE 8

|  | Ratio of Core-Shell Dielectric Particles in Dielectric Particles | X7S Characteristic | MTTF [h] | Determination |
|---|---|---|---|---|
| Ex. 11 | 50% or more | OK | 8.2 | A |
| Ex. 12 | 50% or more | OK | 8.6 | A |
| Ex. 13 | 50% or more | OK | 7.4 | A |
| Ex. 4 | 50% or more | OK | 7.1 | A |
| Ex. 14 | 50% or more | OK | 8.1 | A |
| Ex. 15 | 50% or more | OK | 7.0 | A |
| Ex. 16 | 50% or more | OK | 7.1 | A |
| Ex. 17 | 50% or more | OK | 7.3 | A |
| Ex. 18 | 50% or more | OK | 7.4 | A |
| Ex. 19 | 50% or more | OK | 6.8 | B |
| Ex. 20 | 50% or more | OK | 6.5 | B |
| Ex. 21 | 50% or more | OK | 6.3 | B |
| Ex. 22 | 50% or more | OK | 6.6 | B |
| Ex. 23 | 50% or more | OK | 5.1 | B |
| Ex. 24 | 50% or more | OK | 5.4 | B |

Table 7 and Table 8 show that a better high-temperature load lifetime was obtained when the ratio of the amount of the oxide of the R element in terms of $R_2O_3$ to the amount of the oxide containing Si in terms of $SiO_2$ was 0.8:1 to 2.2:1; the ratio of the amount of the oxide of the M element in terms of MO to the amount of the oxide containing Si in terms of $SiO_2$ was 0.2:1 to 1.8:1; the ratio of the core-shell dielectric particles was 50% or more; and the oxide of the R element was contained at 1.0 part by mol or more and 3.2 parts by mol or less in terms of $R_2O_3$, the oxide of the M element was contained at 0.2 parts by mol or more and 1.6 parts by mol or less in terms of MO, and the oxide containing Si was contained at 0.8 parts by mol or more and 3.2 parts by mol or less in terms of $SiO_2$, with respect to 100 parts by mol of barium titanate (Examples 4 and 11-18).

(Experiment 5)

In Experiment 5, an experiment related to Examples 23, 25, 11, 26, and 27 was carried out.

In Experiment 5, a multilayer ceramic capacitor sample was prepared in a similar manner to Experiment 1 except that each amount of the oxide of the R element, the oxide of the M element, and $SiO_2$ was set as shown in Table 9, and the characteristics were evaluated similarly to Experiment 1. The results are shown in Table 10. In addition to a similar characteristic evaluation to Experiment 1, the high temperature insulation specific resistance and relative permittivity were also evaluated in the following manner.

(High Temperature Insulation Resistance Value)

For the capacitor sample heated at 125° C. for 20 minutes, an insulation resistance value after applying a DC voltage of 25 V/μm for one minute was measured using an insulation resistance tester (R8340A manufactured by ADVANTEST CORPORATION) while maintaining the temperature at 125° C. A high-temperature insulation specific resistance value was calculated from an average interlayer thickness and an overlapping area of the capacitor sample. In the present example, a high-temperature insulation specific resistance value of $5.0 \times 10^9$ Ωm or more was considered to be good. The results are shown in Table 10.

(Relative Permittivity)

The capacitor sample was heated at 150° C. for one hour, and a capacitance value after 24 hours was measured at the reference temperature (25° C.) with a digital LCR meter (4274A manufactured by YHP) under the conditions of frequency: 1.0 kHz and the input signal level (measurement voltage): 1.0 Vrms. A relative permittivity εr (no unit) was calculated from the capacitance, the average interlayer thickness, and the overlapping area of the capacitor sample. Preferably, the relative permittivity was higher. In the present example, a relative permittivity of 2000 or more was considered to be good and described as "A", and a relative permittivity of 2000 or less was described as "B". The results are shown in Table 10.

TABLE 9

| | Ratio of $R_2O_3$:$SiO_2$ | Ratio of MO:$SiO_2$ | R (in terms of $R_2O_3$) [parts by mol] | M (in terms of MO) [parts by mol] | $SiO_2$ [parts by mol] |
|---|---|---|---|---|---|
| Ex. 23 | 2.0:1 | 0.4:1 | 1.40 | 0.28 | 0.70 |
| Ex. 25 | 2.2:1 | 0.25:1 | 3.20 | 0.36 | 1.45 |
| Ex. 11 | 2.2:1 | 0.5:1 | 3.20 | 0.73 | 1.45 |
| Ex. 26 | 2.2:1 | 0.65:1 | 3.20 | 0.94 | 1.45 |
| Ex. 27 | 2.2:1 | 1.2:1 | 3.20 | 1.74 | 1.45 |

TABLE 10

| | Ratio of Core-Shell Dielectric Particles in Dielectric Particles | X7S Characteristic | MTTF [h] | High-Temperature Insulation Specific Resistance Value [Ωm] | Relative Permittivity $\varepsilon\_r$ | Determination |
|---|---|---|---|---|---|---|
| Ex. 23 | 50% or more | OK | 5.1 | 8.6E+09 | A | B |
| Ex. 25 | 50% or more | OK | 7.2 | 1.1 · E+10 | A | A |
| Ex. 11 | 50% or more | OK | 8.2 | 1.3 · E+10 | A | A |
| Ex. 26 | 50% or more | OK | 7.1 | 9.3 · E+09 | A | A |
| Ex. 27 | 50% or more | OK | 6 | 6.1 · E+08 | B | B |

Table 9 and Table 10 show that good results were obtained in both of high-temperature insulation specific resistance value and relative permittivity when the ratio of the amount of the oxide of the R element in terms of $R_2O_3$ to the amount of the oxide containing Si in terms of $SiO_2$ was 0.8:1 to 2.2:1; the ratio of the amount of the oxide of the M element in terms of MO to the amount of the oxide containing Si in terms of $SiO_2$ was 0.2:1 to 1.8:1; the ratio of the core-shell dielectric particles was 50% or more; and the amount of the oxide of the M element was 1.0 mol % or less (Examples 23, 25, 11, and 26). In addition, it was confirmed that the capacitor sample satisfied the X7S characteristic and obtained a particularly good high-temperature load lifetime when the amount of the oxide of the M element was 0.3-1.0 mol % (Examples 25, 11, and 26).

(Experiment 6)

In Experiment 6, an experiment related to Examples 14, 11, 12, 2, 21, and 3 was carried out.

In Experiment 6, a multilayer ceramic capacitor sample was prepared in a similar manner to Experiment 1 except that each amount of the oxide of the R element, the oxide of the M element, and $SiO_2$ was set as shown in Table 11, and the characteristics were evaluated similarly to Experiment 1. The results are shown in Table 12. In addition to a similar characteristic evaluation to Experiment 1, a minimum value and a maximum value of LB/LA were measured.

(Minimum Value and Maximum Value of LB/LA)

LB/LA of each of the line segments VL1-VL10 was obtained by the above-mentioned method, and the minimum and maximum values among them are shown in Table 12. The graph α and the graph β in FIG. 4 are related to Example 11.

TABLE 11

| | Ratio of $R_2O_3$:$SiO_2$ | Ratio of MO:$SiO_2$ | R (in terms of $R_2O_3$) [parts by mol] | M (in terms of MO) [parts by mol] | $SiO_2$ [parts by mol] |
|---|---|---|---|---|---|
| Ex. 14 | 1.5:1 | 0.7:1 | 1.71 | 0.80 | 1.14 |
| Ex. 11 | 2.2:1 | 0.5:1 | 3.20 | 0.73 | 1.5 |
| Ex. 12 | 1.5:1 | 0.5:1 | 2.20 | 0.73 | 1.47 |
| Ex. 1 | 1.5:1 | 0.5:1 | 3.00 | 1.00 | 2.0 |
| Ex. 21 | 2.0:1 | 0.2:1 | 1.50 | 0.15 | 0.75 |
| Ex. 3 | 2.2:1 | 0.5:1 | 4.40 | 1.00 | 2.0 |

TABLE 12

| | Ratio of Core-Shell Dielectric Particles in Dielectric Particles | X7S Characteristic | MTTF [h] | LB/LA Minimum Value | LB/LA Maximum Value | Determination |
|---|---|---|---|---|---|---|
| Ex. 14 | 50% or more | OK | 8.1 | 0.42 | 0.88 | A |
| Ex. 11 | 50% or more | OK | 8.2 | 0.33 | 0.79 | A |
| Ex. 12 | 50% or more | OK | 8.6 | 0.31 | 0.87 | A |
| Ex. 1  | 50% or more | OK | 7.4 | 0.22 | 0.75 | A |
| Ex. 21 | 50% or more | OK | 6.3 | 0.39 | 0.92 | B |
| Ex. 3  | 50% or more | OK | 5.2 | 0.11 | 0.67 | B |

Table 12 shows that the capacitor sample satisfied the X7S characteristic and obtained a particularly good high-temperature load lifetime when the ratio of the amount of the oxide of the R element in terms of $R_2O_3$ to the amount of the oxide containing Si in terms of $SiO_2$ was 0.8:1 to 2.2:1; the ratio of the amount of the oxide of the M element in terms of MO to the amount of the oxide containing Si in terms of $SiO_2$ was 0.2:1 to 1.8:1; the ratio of the core-shell dielectric particles was 50% or more; and the minimum and maximum values of LB/LA were 0.2 or more and 0.9 or less, namely, LB/LA was satisfied in an optional line segment VL (Examples 14, 11, 12, and 1).

(Experiment 7)

In Experiment 7, an experiment related to Examples 22, 12, and 23 was carried out.

In Experiment 7, a multilayer ceramic capacitor sample were prepared in a similar manner to Example 12 except that a barium titanate powder whose average particle size was 130 nm was used as the main component, and the holding temperature during firing was 1220° C. in Example 22; and that a barium titanate powder whose average particle size was 250 nm was used as the main component, and the holding temperature during firing was 1260° C. in Example 23. In addition to a similar characteristic evaluation to Experiment 1, the average particle size of dielectric particles was measured in the following manner, and whether or not the temperature characteristic satisfied the X7R characteristic was evaluated.

(Average Particle Size of Dielectric Particles)

In the method of measuring an average particle size of dielectric particles, first of all, the obtained capacitor sample was cut on a surface perpendicular to the internal electrode layers, and the cut surface was polished. Then, the polished surface was chemically etched and then observed with a scanning electron microscope (SEM), and about 1000 particles were counted to calculate an average particle size of dielectric particles assuming that the shapes of the dielectric particles were spheres. The results are shown in Table 14.

(X7R Characteristic (Capacity Change Rate at 125° C. (Temperature Characteristic)))

For the capacitor sample, with conditions of 1.0 kHz (frequency) and 1.0 Vrms (input signal level (measurement voltage)), the capacitance at −55° C. to 125° C. was measured, the change rate ΔC of the capacitance was calculated based on the capacitance at 25° C., and whether or not the X7R characteristic (the temperature characteristic of the EIA standard) was satisfied was evaluated. In the present example, whether or not the capacity change rate ΔC on the higher temperature side (125° C.) was within ±15% was evaluated. If the capacity change rate at 125° C. satisfies ±15%, the capacity change rate at −55° C. can also satisfy the X7R characteristic. The results are shown in Table 14.

TABLE 13

| | Ratio of $R_2O_3$:$SiO_2$ | Ratio of MO:$SiO_2$ | R (in terms of $R_2O_3$) [parts by mol] | M (in terms of MO) [parts by mol] | $SiO_2$ [parts by mol] | Average Particle Size of Dielectric Particles [µm] |
|---|---|---|---|---|---|---|
| Ex. 22 | 1.5:1 | 0.5:1 | 2.20 | 0.73 | 1.47 | 0.15 |
| Ex. 12 | 1.5:1 | 0.5:1 | 2.20 | 0.73 | 1.47 | 0.23 |
| Ex. 23 | 1.5:1 | 0.5:1 | 2.20 | 0.73 | 1.47 | 0.3 |

TABLE 14

| | Ratio of Core-Shell Dielectric Particles in Dielectric Particles | X7S Characteristic | MTTF [h] | Determination |
|---|---|---|---|---|
| Ex. 22 | 50% or more | OK | 7 | A |
| Ex. 12 | 50% or more | OK | 8.6 | A |
| Ex. 23 | 50% or more | OK | 9 | A |

Table 13 and Table 14 show that the capacitor sample satisfied the X7R characteristic and obtained a particularly good high-temperature load lifetime when the ratio of the amount of the oxide of the R element in terms of $R_2O_3$ to the amount of the oxide containing Si in terms of $SiO_2$ was 0.8:1 to 2.2:1; the ratio of the amount of the oxide of the M element in terms of MO to the amount of the oxide containing Si in terms of $SiO_2$ was 0.2:1 to 1.8:1; the ratio of the core-shell dielectric particles was 50% or more; and the average particle size of the dielectric particles was 150-300 nm.

DESCRIPTION OF THE REFERENCE NUMERICAL

1 . . . multilayer ceramic capacitor
10 . . . element body
2 . . . dielectric layer
20 . . . dielectric particle
200 . . . core-shell dielectric particle
200a . . . core portion
200b . . . shell portion
202 . . . complete-solid-solution dielectric particle
22 . . . segregation particle
3 . . . internal electrode layer
4 . . . external electrode

What is claimed is:

1. An electronic device comprising a dielectric layer and a pair of internal electrode layers sandwiching the dielectric layer, wherein
the dielectric layer including a dielectric ceramic composition,
the dielectric ceramic composition comprising a barium titanate, an oxide of an R element, an oxide of an M element, and an oxide containing Si,
the R element is one or more elements selected from Eu, Gd, Tb, Dy, Y, Ho, and Yb,
the M element is one or more elements selected from Mg, Ca, Mn, V, and Cr,
a mole ratio of an amount of the oxide of the R element in terms of $R_2O_3$ to an amount of the oxide containing Si in terms of $SiO_2$ is 0.8:1 to 2.2:1,
a mole ratio of an amount of the oxide of the M element in terms of MO to an amount of the oxide containing Si in terms of $SiO_2$ is 0.2:1 to 1.8:1, 50% or more of the number of dielectric particles constituting the dielectric ceramic composition are core-shell dielectric particles having a core-shell structure,
at least one of the R element, the M element, and the oxide containing Si is solid-soluted into the barium titanate in shell portions of the core-shell dielectric particles,
core portions of the core-shell dielectric particles are substantially made of the barium titanate,
at least a part of the dielectric particles are complete-solid-solution dielectric particles, and
a ratio (LB/LA) of LB to LA is 0.2 or more and 0.9 or less, where LA is a length of a line segment perpendicular to the internal electrode layers and extending from a boundary between the dielectric layer and either one of the internal electrode layers and a boundary between the dielectric layer and the other one of the internal electrode layers, and LB is a total length of the shell portions and the complete-solid-solution dielectric particles on the line segment.

2. The electronic device according to claim 1, wherein the dielectric particles have an average particle size of 0.15 μm or more and 0.30 μm or less.

3. The electronic device according to claim 1, wherein
the oxide of the R element is contained at 1.0 part by mol or more and 3.2 parts by mol or less in terms of $R_2O_3$,
the oxide of the M element is contained at 0.2 parts by mol or more and 1.6 parts by mol or less in terms of MO, and
the oxide containing Si is contained at 0.8 parts by mol or more and 3.2 parts by mol or less in terms of $SiO_2$, with respect to 100 parts by mol of the barium titanate.

* * * * *